Sept. 7, 1965   L. W. LESSLER   3,205,506
SELF-THREADING MOTION PICTURE MACHINE
Filed July 5, 1962   6 Sheets-Sheet 1

INVENTOR.
LEW W. LESSLER

ATTORNEYS

Sept. 7, 1965 L. W. LESSLER 3,205,506
SELF-THREADING MOTION PICTURE MACHINE
Filed July 5, 1962 6 Sheets-Sheet 3

INVENTOR.
LEW W. LESSLER

BY James × Franklin

ATTORNEYS

Sept. 7, 1965  L. W. LESSLER  3,205,506
SELF-THREADING MOTION PICTURE MACHINE
Filed July 5, 1962  6 Sheets-Sheet 4

INVENTOR.
LEW W. LESSLER

BY
ATTORNEYS

Sept. 7, 1965　　　　　L. W. LESSLER　　　　　3,205,506
SELF-THREADING MOTION PICTURE MACHINE
Filed July 5, 1962　　　　　　　　　　　　6 Sheets-Sheet 5

INVENTOR.
LEW W. LESSLER
BY
ATTORNEYS

Sept. 7, 1965   L. W. LESSLER   3,205,506
SELF-THREADING MOTION PICTURE MACHINE
Filed July 5, 1962   6 Sheets-Sheet 6

INVENTOR.
LEW W. LESSLER
BY
ATTORNEYS

United States Patent Office 3,205,506
Patented Sept. 7, 1965

3,205,506
SELF-THREADING MOTION PICTURE
MACHINE
Lew W. Lessler, Elmhurst, N.Y., assignor to Dejur-Amsco
Corporation, Long Island City, N.Y., a corporation of
New York
Filed July 5, 1962, Ser. No. 207,704
20 Claims. (Cl. 352—158)

This invention relates to an improved self-threading motion picture machine, and particularly to improvements in a self-threading motion picture camera.

In motion picture cameras with self-threading mechanisms of the type to which the present invention pertains, the film strip in being automatically threaded through the camera, is first manually advanced directly from the supply spool to the film gate, where it is taken up by the intermittent drive and is intermittently driven through the film gate, and thence through automatic film loop forming mechanism and film guiding mechanism to a frictionally driven take-up spool, to which spool it becomes self-attached.

The prime objects of the present invention centers about the construction and mechanical design of a self-threading camera of this type, characterized by the following structural and functional features:

(1) The main film guide, provided with an end structure for intercepting the rotation of the take-up spool and entering the film receiving slot in the spool core, is automatically moved into an extended film guiding position during the self-threading operation, in which position the film is guided to the spool core and the film leader is caused to enter into the spool core through the film receiving slot, the said main film guide being then automatically moved to a retracted position upon completion of the self-threading operation.

(2) Associated with the main film guide is the film loop former which functions to produce a loop in the film between the intermittent feed and the take-up spool and to direct the film to the main film guide. The loop former includes a movable member movable between film engaging and film releasing positions, the film engaging position being assumed for the loop forming step and the film releasing position being assumed for the continued unhindered running of the film in the operation of the camera.

(3) The said main film guide is automatically moved into its film guiding position by the manual closing of the film gate (which gate is opened for manually advancing the film from the supply spool to the film gate), and is automatically retracted from its film guiding position by a back pressure exerted by the film on the movable member of the loop former, after the film leader has entered the spool core.

(4) The main film guide and the film loop former are further so associated or interrelated that the movable member of the loop former functions as a latch for latching the main film guide in its extended film guiding position, and conversely the film guide in its retracted position functions as a means for holding the movable member of the loop former in its film releasing position.

(5) For assisting the main film guide in guiding the film to the take-up spool and into its core, and for compressing the coils or convolutions of the film about the core circumference, there is provided a film roll guide movable between an outward position clearing the take-up spool and an inward position for engagement with the film roll convolutions on the core. This film roll guide is also controlled from the film gate, being moved to its outward position upon gate opening and to its inward position upon gate closing.

(6) For effectively compressing the coils or convolutions of the film about the core circumference, the roll size measuring member of the camera is associated with the film roll guide to assist the functioning of the same, a movement being imparted and a control being exercised on the measuring member corresponding to those of the film roll guide.

These varied objects and others ancillary thereto, are accomplished in the camera of the present invention by quite simple mechanism, effectively organized and combined, and rendered capable of simple manipulation by the operator.

To the accomplishment of the foregoing objects, and such other objects as may hereinafter appear, the present invention relates to the self-threading motion picture machine as sought to be defined in the appended claims considered together with the following specification thereof and the accompanying drawings, in which:

Figure 1:
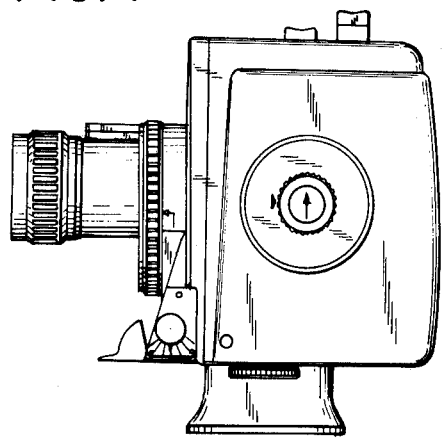
FIGURE 1 is a side elevational view of a camera to which the structure of the present invention is applied.
Figure 2:
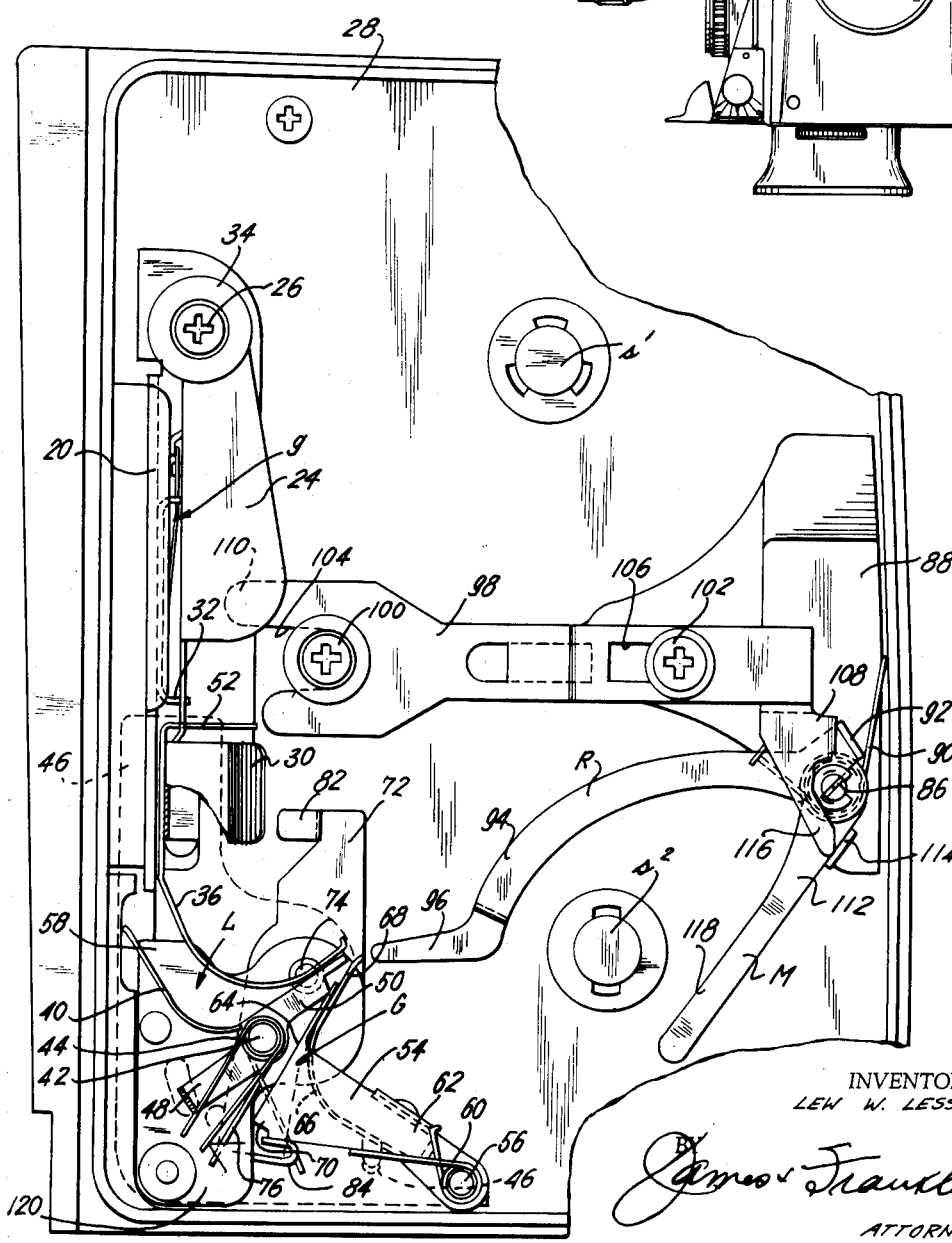
FIG. 2 is an enlarged elevational view of the side of the camera shown in FIG. 1 with the cover thereof removed; this figure depicts the film chamber of the camera empty, the film gate closed and all of the film guiding and driving units at rest.

Referring now more in detail to the drawings, and referring first to FIGS. 1 and 2 thereof, the self-threading apparatus of the present invention is shown applied to a camera of the type shown in FIG. 1 of the drawings embodying a structure as shown combinedly in the patents to Lunzer, No. 2,996,968, of August 22, 1961, and Lohmeyer, No. 3,002,422, of October 3, 1961, which when the removable cover for access to film loading is removed, reveals the assembly of parts shown at rest position in FIG. 2 of the drawings. This assembly comprises a spindle $s'$ for receiving a supply spool, a spindle $s^2$ for receiving a take-up spool, the said spindle $s^2$ being frictionally driven from the camera motor, a film gate generally designated as $g$, a loop former generally designated as L between the film gate and the take-up spindle, a main film guide generally designated as G associated with the loop former L, and a film roll guide R and a roll size measuring member M associated with the take-up spindle $s^2$.

Figure 3:
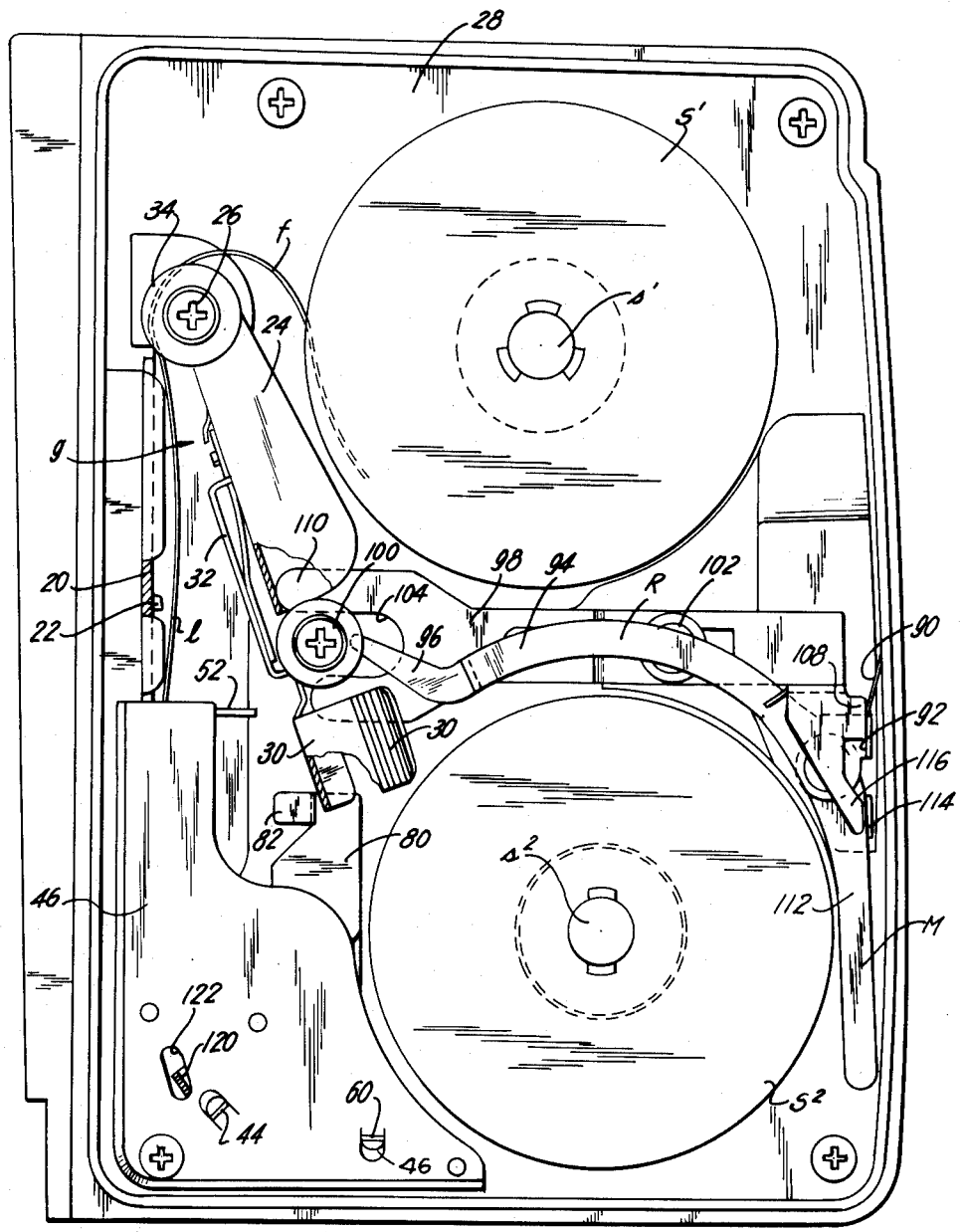
FIG. 3 is a view similar to FIG. 2 showing the position of the parts with a full supply spool, and an empty take-up spool, the film gate open and the film leader as manually placed in the open film gate.
Figure 4:
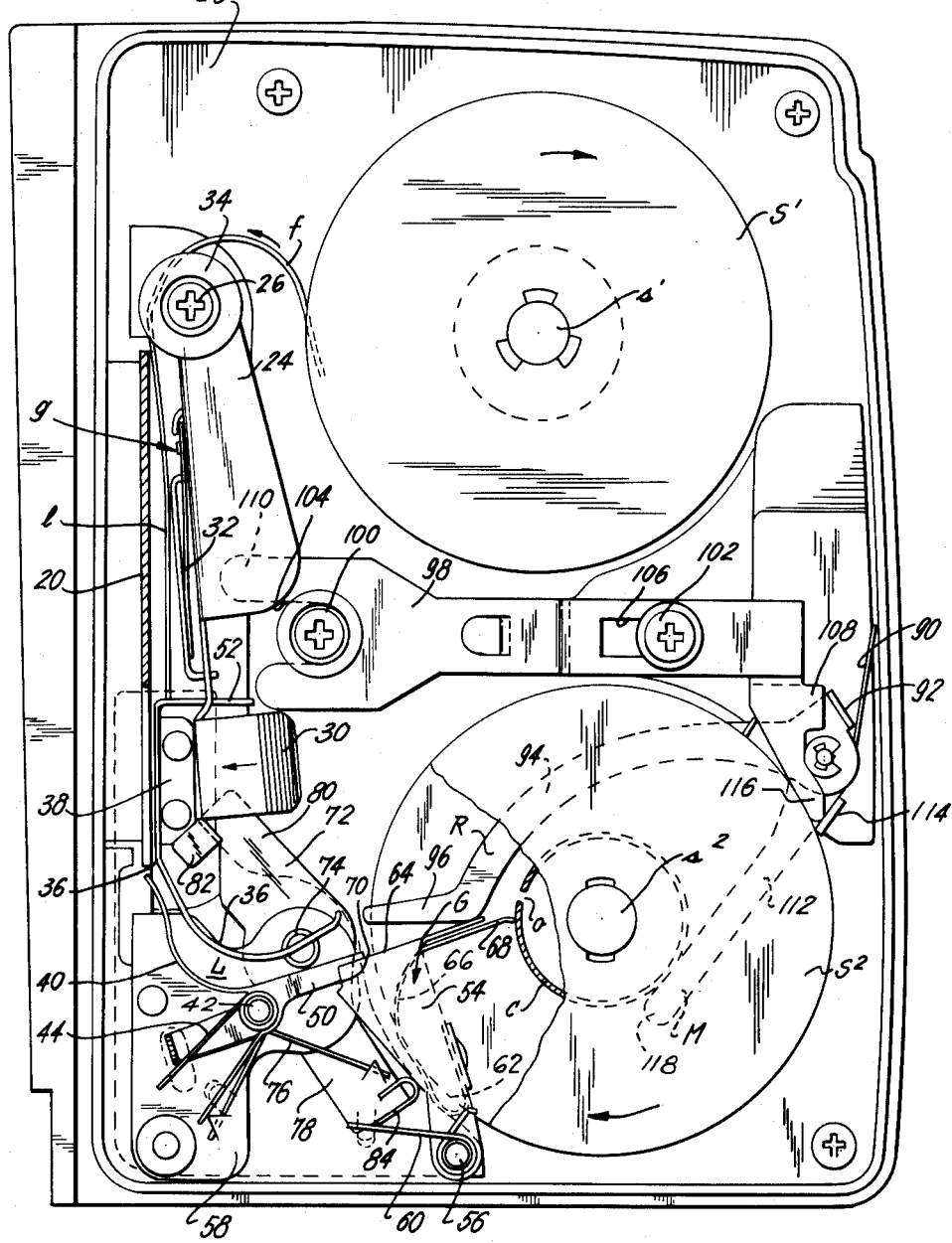
FIG. 4 is a view similar to FIG. 2 showing the position of the parts with the film in starting position, the film gate partly closed, and with the movable member of the loop former, the main film guide, the film roll guide and the roll size measuring member, all in the position for forming the film loop and guiding the same to and into the spool core.
Figure 5:
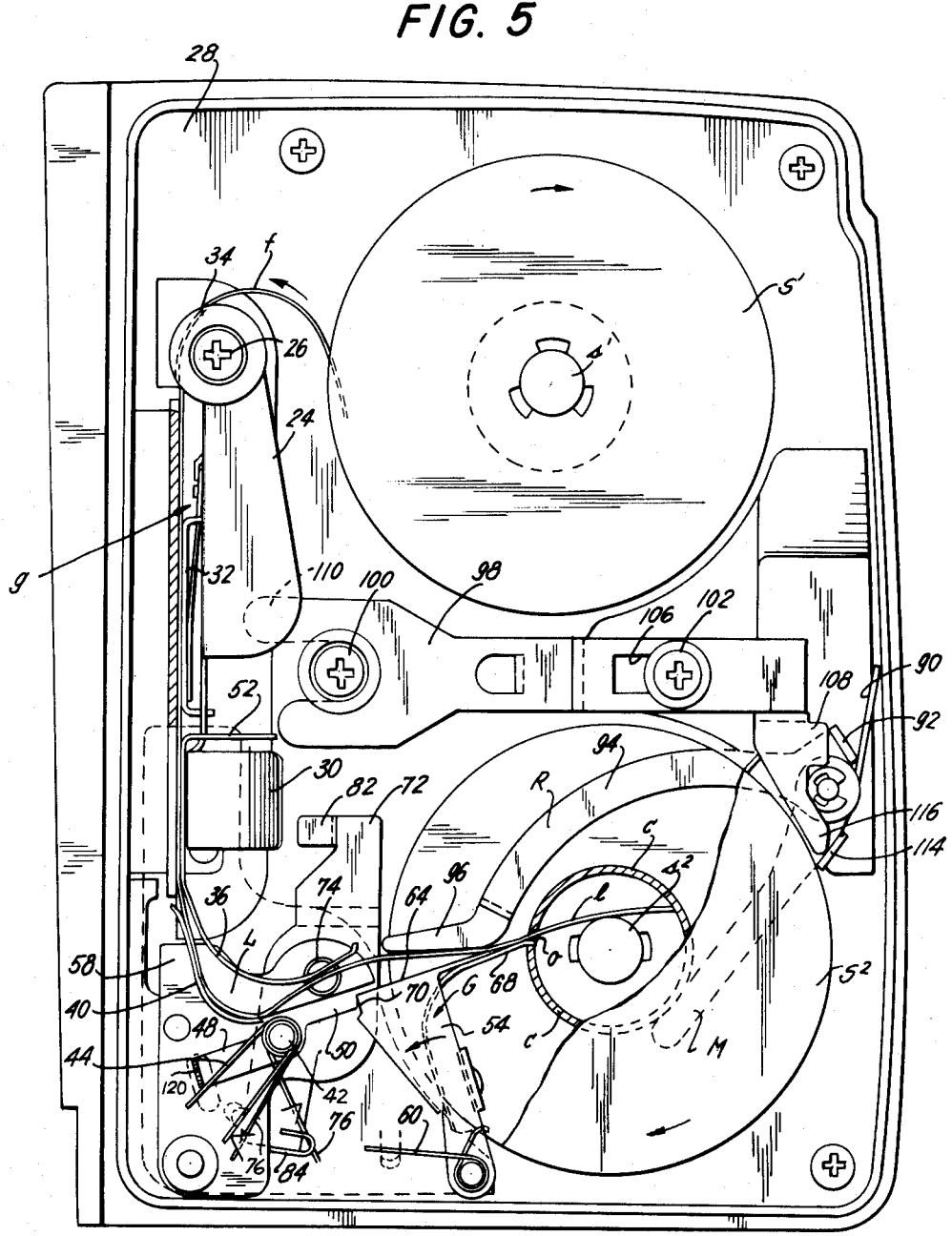
FIG. 5 is a similar view showing the position of the parts with the film gate closed and with the film self-threaded, with the leader end within the take-up spool core and with the film in a position for effecting the return movement of the main film guide and the loop former to their original rest positions (as shown in FIG. 2)

The supply spindle $s'$ is adapted to receive a supply spool S' of motion picture film $f$ and the take-up spindle $s^2$ is adapted to receive an empty take-up spool $S^2$ as clearly shown, for example, in FIG. 3 to FIG. 5 of the drawings. These spools are formed with a hollow central core $c$, the core being formed with a slot or opening $o$ for receiving the leading end $l$ of the film $f$, as best shown in FIG. 5 of the drawings. It will be understood that the take-up spool $S^2$ is rotated by the frictionally driven spindle $s^2$ and therefore its movement may be temporarily intercepted or halted in the operation of the self-threading apparatus as further described hereinafter. The supply and take-up spools rotate in the directions indicated by the arrows in FIGS. 4 and 5.

The film gate $g$ comprises a fixed plate 20 formed with the customary film aperture in which is reciprocated the claw member 22 of the intermittent drive for the film, and a movable member 24 pivotally mounted at 26 on the camera wall 28, the said movable film gate member being shaped as shown in the figures. For manually moving the film gate member 24, the said member is formed integrally with a finger grip 30. The movable gate member is provided with the usual film spring urged pressure pad 32 mounted thereon. The pivotal mount for the movable gate member is formed with a flanged guide post 34. This movable film gate member 24 is movable manually between the closed position shown in FIGS. 2 and 5 and the open position shown in FIG. 3. The initial step in loading the film after the supply spool S' is mounted in position is to open the film gate $g$ and insert the film leader $l$ into the open film gate after looping the same about the flanged guide post 34 as shown in FIG. 3 of the drawings.

The film loop former L comprises a fixed member 36 secured to the camera wall 28 by means of a flange 38 (FIG. 4) and a movable loop forming member 40 pivoted to the camera frame parts at 42 (in a manner best depicted in FIG. 7 of the drawings), the said movable member 40 being spring loaded by the spring 44 anchored at one end to the camera frame part 46 (see FIG. 6) and at the other end against an arm 48 integral with the movable member 40. The fixed and stationary loop forming members 36 and 40 are shaped in the manner best shown in FIGS. 2, 4 and 5 of the drawings for looping and guiding the film, and the movable member is also integrally formed with a part 50 serving as a latch means as will be further described hereinafter. The fixed member 36 is also formed at its top with a platform 52 acting as a stop for the film leader $l$ when the latter is inserted into the film gate, this relation being best shown in FIGS. 3 and 4 of the drawings.

Figure 7:
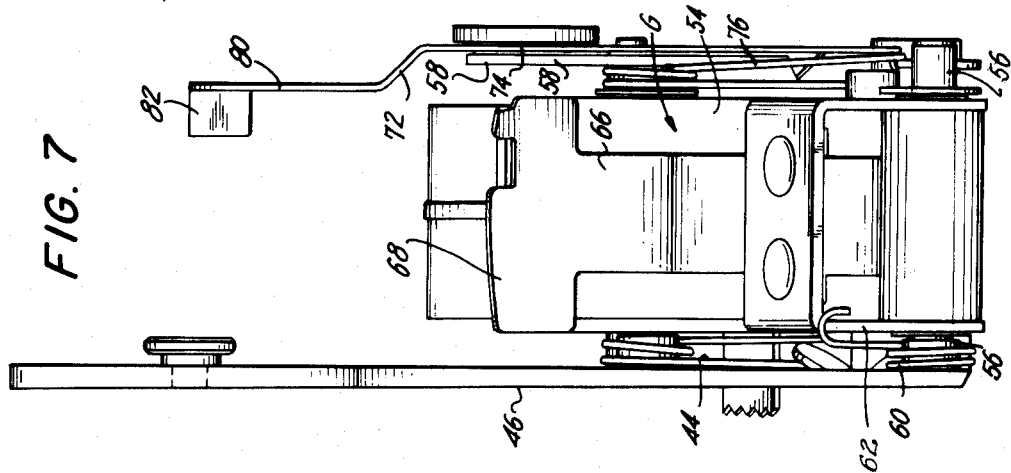
FIG. 7 is a side elevational view of the structure shown in FIG. 6.
Figure 6:
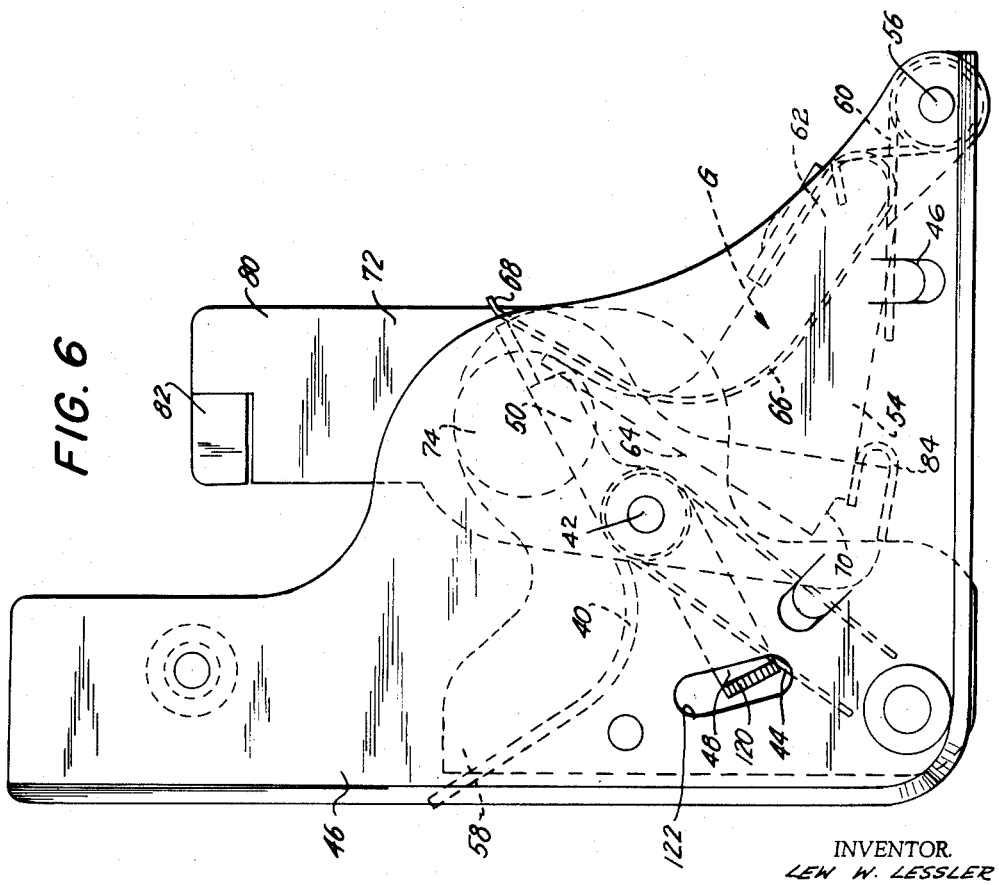
FIG. 6 is a front elevational view of the loop former and main film guide assembly, removed from the camera.

The main film guide G comprises a member 54 pivotally mounted at 56 by means of trunnions journalled in the camera frame plates 46 and 58 (as best seen in FIGS. 6 and 7 of the drawings), the said guide member 54 being movable between an extended position, as shown in FIGS. 4 and 5, and a retracted position as shown in FIG. 2 of the drawings, the said guide member being spring loaded for movement to its retracted position by means of the spring 60 anchored at one end to the frame plate 46 and at the other end to an arm 62 of the guide member as best shown in FIGS. 2, 6 and 7 of the drawings. The guide member is formed at its top with a guide plate 64 and is also provided with a leaf spring 66 anchored at one end to the arm 62 and terminating at its other end in a blade 68, the said leaf spring being somewhat freely movable within the confines of the member 54. The structure of this main guide member 54 is therefore such that when it is moved or projected from its retracted position to its extended position shown in FIG. 4, the leaf spring blade 68 thereof is adapted to resiliently engage the periphery of the spool core $c$ and to then enter the opening or slot $o$ of the core when the same registers with the blade (in the rotation of the spool), as shown in FIG. 5 of the drawings, at which time the blade 68 enters the core slot, thereby intercepting and restraining (for the time being) further rotation of the take-up spool, the guide plate 64 of the guide member being at this time in a position for guiding the film from the loop former L to and into the core of the take-up spool.

The main film guide G and the loop former L are further so associated or interrelated that the movable member 40 of the loop former functions as a latch for latching the main film guide G in its extended film guiding position, and conversely the film guide G in its retracted position functions as a means for holding the movable member 40 of the loop former in its film releasing position. This interrelation is best shown in FIGS. 2 and 4 of the drawings. The part 50 of the movable loop former member 40 forms a latch for engaging the rear end 70 of the member 54, thereby latching the guide member in the position shown in FIG. 4, the latching being under the influence of the spring 44 active on the movable loop former member 40. When this latching is tripped, the guide member G under the influence of its loading spring 60 moves to its retracted position shown in FIG. 2, at which time the guide plate 64 of the guide G engages the part 50 of the loop former member 40 holding the latter against the load of its spring 44 in the position shown in FIG. 2 of the drawings, in which position the movable loop former member 40 releases its engagement with the film, thereby permitting a freedom of movement of the film during camera operation. In its latching position (FIG. 4) the movable film former 40 is in a film engaging position, cooperating with the fixed loop former member 36 for looping and guiding the film. It will be understood that the film engaging position of the member 40 is assumed for the loop forming step and the film releasing position thereof is assumed for the continued unhindered running of the film in the operation of the camera.

Figure 9:
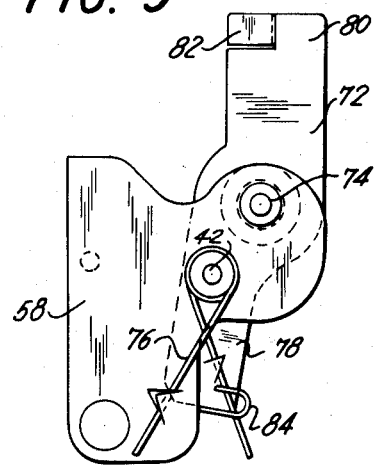
FIG. 9 is an elevational view of the operating lever sub-assembly.
Figure 10:
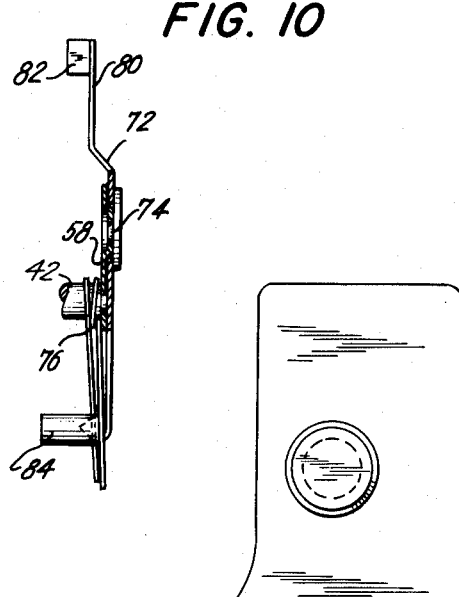
FIG. 10 is a side elevational view of the structure shown in FIG. 9.
Figure 8:
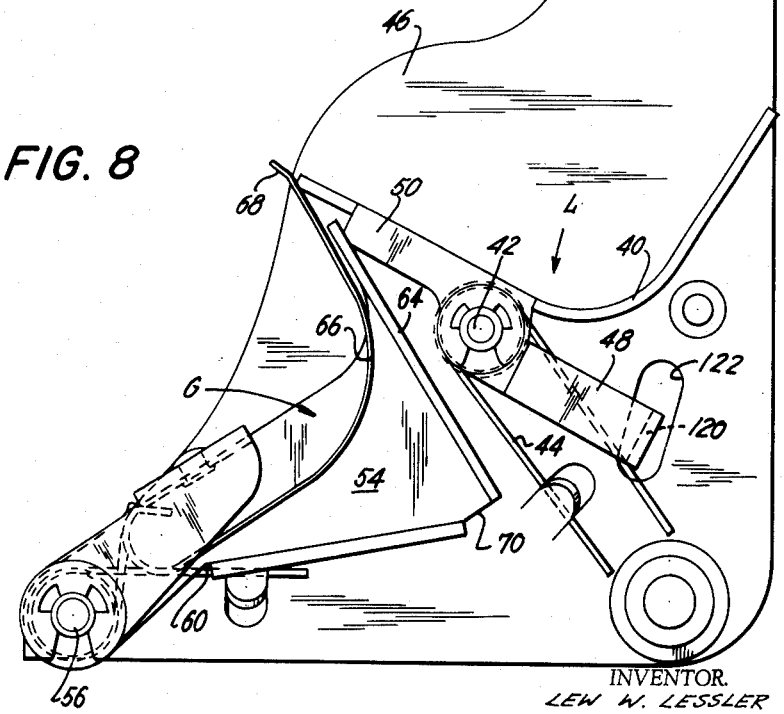
FIG. 8 is a rear elevational view of the same with an operating lever and a back plate removed therefrom.

The main film guide G is automatically moved into its film guiding position by the manual closing of the film gate $g$ and is automatically retracted from its film guiding position by a back pressure exerted by the film on the movable member 40 of the film former after the film leader $l$ has entered the spool core $c$ and has abutted the inner wall of the core $c$ in the manner depicted in FIG. 5 of the drawings. For moving the film guide G to its extended position, there is provided a lever 72 pivoted at 74 on the frame plate 58 and movable between an operating position shown in FIG. 4 of the drawings and a normal and returned position shown in FIG. 5 of the drawings, said lever being spring loaded for movement to its return position by means of a spring 76 anchored at one end to the plate 58 and at its other end to the bottom arm 78 of the lever, as best shown in FIGS. 4 and 9 of the drawings. The upper arm 80 of said lever is formed with an offset lug portion 82 which is engageable by the rear side of the finger grip 30 (of the movable gate member) when the movable gate member 24 is moved from the position shown in FIG. 3 in the direction indicated by the arrow in FIG. 4. Upon this movement of the lever 72 a toe portion 84 formed on the arm 78 of the lever engages a wall of the guide member 54 (see FIGS. 2 and 4 of the drawings) and moves the said member against its spring load from the position shown in FIG. 2 to the position shown in FIG. 4, whereupon the guide G is latched in that position. When the film gate is moved to the fully closed position (from FIG. 4 to FIG. 5), the offset lug portion 82 is freed from engagement with the finger grip 30, the lever 72 being thereby released for movement under its spring load to its return position shown in FIG. 5 of the drawings. Due to the resilience of the arm 80 and the cam formation of the offset portion 82, the lever 72 is unaffected by the opening of the gate.

The film roll guide R comprises a lever movable between an outward position clearing the take-up spool $S^2$, as shown in FIG. 3 of the drawings, and an inward position, shown, in FIG. 2 of the drawings, the movement to the inward position being for the dual purpose of assisting the main film guide G in guiding the film to the take-up spool and for compressing the coils or convolutions of the film about the core circumference in the continued operation of the camera. This lever is pivoted at 86 on a camera frame part 88 and is spring loaded by the spring 90 for movement of the lever to its inward position. The lever is formed with an arm 92 engageable for moving the lever and with an arm 94 provided at its terminus with a toe portion 96, the latter defining an auxiliary guide member cooperating with the guide plate 64 of the main guide G in a manner best shown in FIG. 4 of the drawings. Movement of the film roll guide R to its outward position is effected by a slidable control bar 98 mounted for slidable movement on the camera wall 28 by means of spaced studs 100 and 102 fixed to the wall cooperating with slots 104 and 106 formed in the slide bar. The slide bar is formed with a finger 108 adapted to engage the arm 92. The slide bar 98 at its opposite end is formed with a lug extension 110 adapted to be engaged by a part of the movable film gate member 24 when the latter is moved to film gate opening position. It will therefore be seen that upon opening the film gate the slide bar 98 will be moved from its FIG. 2 to its FIG. 3 position, thereby moving the film roll guide R from its inner to its outer position, permitting the mounting of the take-up spool into the camera. Upon closing the film gate g the main film guide G will be moved to the position shown in FIG. 5 (as hereinbefore described) and the roll guide R will move under the influence of its spring to the position shown in FIG. 5 of the drawings for assisting the guiding of the film into the spool core. Upon the retracting movement of the main film guide G, the film roll guide R will under the influence of the spring move in contact with the spool core and the film coils or convolutions formed thereon, thereby assisting in compacting the coils onto the core. It will be understood that the roll guide R moves outwardly responsive to the increasing diameter of the coils on the spool.

The roll size measuring member M of the camera is associated with the film roll guide to assist the coil compacting functioning of the same, a movement being imparted to the said measuring member and a control being exercised on the same corresponding to those of the film roll guide. To this end the measuring member M comprises a lever 112 having an arm 114 engageable by a second finger 116 formed on the slide bar 98 and an arm 118 at its other end adapted for engagement with the core c of the take-up spool as indicated in FIG. 4 of the drawings, the said measuring member M being also spring loaded for movement to its inward position. Thereby the member M partakes of the same movements as the roll guide R and assists the latter in compacting the coil convolutions onto the spool core.

It is also desirable to provide independent manual means for unlatching the main guide G for its retraction movement. To accomplish this the arm 48 of the movable loop former member 40 is formed with a finger portion 120 which extends through a slot or opening 122 in the frame plate 46 (see particularly FIG. 3) and which may be manually depressed to release the latching of the main guide G.

The use and operation of the self-threading apparatus of the motion picture camera of the present invention will be fully apparent from the above detailed description thereof. For loading the camera, the parts are in the rest condition shown in FIG. 2 of the drawings. Should it transpire that the main guide G is in its extended and latched condition, the same may be readily unlatched by depressing the finger 120 extending through the slot 122. The manual operations merely consist in engaging the finger grip 30 and opening the film gate g, in placing a full reel on the supply spindle s', in placing an empty spool on the take-up spindle $s^2$ and in moving the film lead $l$ over the flanged post 34 and into the open film gate, the lower end of the leader being stopped by abutting the platform 52. The parts are then in the position shown in FIG. 3 of the drawings. The film gate is then closed, the parts automatically moving through the positions shown in FIG. 4 and to the positions shown in FIG. 5 of the drawings. The film motor is then operated (either with the camera still open or with the camera closed). Automatic or self-threading of the film then takes place. The film is intermittently operated at the film gate and is self-guided through the loop former L as shown in FIG. 5 of the drawings, and thence is guided between the guide plate 64 of the main guide G and the toe 96 of the roll guide R toward the core c of the take-up spool $S^2$. During this operation the blade 68 of the leaf spring 66 forming part of the film guide G intercepts the rotation of the spool, the blade entering the slot o in the spool core c, thereby holding the spool stationary for the movement of the film leader $l$ into the hollow of the core and against the inner wall thereof, as shown in FIG. 5. The film advance into the core is therefore momentarily stopped, which, together with the motion imparted to the film at the gate by the continuing intermittent action of the claw finger 22, develops a back pressure at the loop section of the film, causing the loop section to buckle and expand against the movable member 40 of the loop former urging the same against the action of the spring 44 to its film releasing position, thereby unlatching the main guide G for its return movement to its retracted position (shown in FIG. 2). At the same time the film guide G because of its engagement with the latch part 50 of the film former member 40 holds the latter in the film releasing position shown in FIG. 2 of the drawings, thereby permitting the film to be fed forward with reduced friction. Upon retracting movement of the main guide G, the roll guide R moves into closer engagement with the spool core c, and together with the measuring member M compresses the coils of the film as the same is wound upon the spool core.

It will be further apparent that while a number of interrelated functions are accomplished by the described apparatus in the self-spreading of the film, the mechanism is simple in construction and is effectively organized to enable a facile operation by an unskilled operator. It will be further apparent that any changes may be made in the structure and arrangement of the parts without departing from the spirit of the invention defined in the following claims.

I claim:

1. A self-threading motion picture machine, comprising in combination with a spindle for a film supply spool, a film gate, and a friction drive spindle for receiving a film take-up spool having a core with a slot, a film loop former provided with a movable member located between the film gate and the drive spindle, a film guide located between said film loop former and the drive spindle and movable between retracted and extended positions, said film guide being provided with a blade end for intercepting the movement of the take-up spool and entering the slot in the spool core when the film guide is moved to its extended position, means for moving the film guide to its extended position, means for latching the film guide in its said extended position, the movable member of said loop former having a part operated by a back pressure of the film after it has entered the spool core for releasing the latching means to return the film guide to its retracted position.

2. The self-threading motion picture machine of claim 1, in which the film gate comprises a fixed member and a movable member, the latter movable for opening and closing the gate, and in which said means for moving the film guide to its extended position is operated by the said movable film gate member when the latter is moved to close the film gate.

3. The self-threading motion picture machine of claim 1, in which the means for latching the film guide in its extended position is connected to and operated by the movable member of said film loop former.

4. The self-threading motion picture machine of claim 3, in which the film gate includes a movable member for opening and closing the gate, and in which the means for moving the film guide to its extended position has a part in the path of movement of the movable film gate member operated thereby when moved to close the film gate.

5. The self-threading motion picture machine of claim 3, in which the film guide is spring loaded for movement to its retracted position and in which the movable member of the film loop former is integral with the latching means and is spring loaded for movement to its latching condition of the latching means.

6. The self-threading motion picture machine of claim 3, in which the film guide is spring loaded for movement to its retracted position and in which the movable member of the film loop former is integral with the latching means and is spring loaded for movement to its latching condition of the latching means, the said film guide and the movable member of the film loop former being provided with coacting parts for holding the loop former in its unlatched and in a released position when the film guide is in a retracted position.

7. The self-threading motion picture machine of claim 1, in which the movable member of the film loop former and the film guide comprise pivoted spring loaded elements.

8. In a self-threading motion picture machine, the combination of a film loop former and a film guide for association with a friction drive spindle, comprising a loop former including a loop former member movable between a film threading position and a film releasing position, a film guide located between said loop former and the drive spindle and movable between retracted and extended positions, means for moving the film guide to its extended position, means connected to the movable loop former member for latching the film guide in its extended position when the loop former is in its threading position, the said movable loop former member having a part operatable by a back pressure of the film being threaded for moving the same to its film releasing position and for unlatching said latching means for movement of the film guide to its retracted position.

9. The combination of film loop former and film guide of claim 8, in which the film guide is spring loaded for movement to its retracted position, and in which the movable loop former member and the latching means connected thereto are spring loaded for movement of the loop former to its threading position and the latching means to its latching condition.

10. The combination of claim 9, in which the film guide and the movable loop former member are provided with engaging parts for holding the loop former in its film releasing position when the film guide is in its retracted position.

11. In a self-threading motion picture machine, in combination with the film loop former and film guide of claim 8, of a film gate provided with a movable member for opening and closing the gate, and means forming part of the means for moving the film guide to its extended position arranged in the path of movement of the movable film gate member and operated thereby when the film gate member is moved to close the film gate.

12. In a self-threading motion picture machine, the combination of film and film roll guides for association with a take-up spool mountable on a drive spindle of the machine, comprising a film guide movable between a retracted position clearing the take-up spool to an extended position in radial relation to the spool core, a film roll guide movable between an outward position also clearing the take-up spool to an inward position for engagement with the film roll convolutions on the core, a film gate provided with a movable member for opening and closing the gate, mechanism connecting the movable film gate member and the film roll guide operative for moving the film roll guide to its outward position upon gate opening and to its inward position upon gate closing, mechanism connecting the movable film gate member and the film guide for moving the guide to its extended position upon gate closing, the film guide and the film roll guide having overlying parts for guiding therebetween the film to the core, separate means for moving the film guide to a retracted position, the film roll guide being effective for remaining in engagement and for guiding the film convolutions of the film during a spool take-up operation.

13. The combination of claim 12, in which the film guide comprises a pivoted member spring loaded to its retracted position, and the film roll guide comprises a pivoted member spring loaded to its inward position.

14. The combination of claim 13, in which the mechanism connecting the film gate member with the film roll guide comprises a slide bar engageable by the former and arranged to engage the latter, and in which the mechanism connecting the film gate member with the film guide comprises a pivoted lever engageable by the former and arranged to engage the latter.

15. The combination of claim 12, to which there is added a roll size measuring member arranged on a side of the drive spindle opposite to that of the film roll guide and also movable similarly thereto between an outward position clearing the take-up spool to an inward position for engagement with the film roll convolutions on the core, the said first mentioned mechanism also connecting the movable film gate member and said roll size measuring member.

16. In a self-threading motion picture machine, the combination of film and film roll guides for association with a take-up reel mountable on a drive spindle of the machine, comprising a film guide movable between a retracted position clearing the take-up reel to an extending position in radial relation to the reel core, a film roll guide movable between an outward position also clearing the take-up reel to an inward position for engagement with the film roll convolutions on the core, mechanism connected to the film roll guide for moving the same to its outward position for mounting the spool and for moving the same back to its inward position, mechanism for moving the film guide to its extended position for film threading, the film guide and the film roll guide having overlying cooperating parts for guiding therebetween the film to the core, separate means for moving the film guide to a retracted position, the film roll guide being effective for remaining in engagement and for guiding the film convolutions of the film during a spool take-up operation.

17. The combination of claim 16, to which there is added a roll size measuring member arranged on a side of the drive spindle opposite to that of the film roll guide and also movable similarly thereto between an outward position clearing the take-up spool to an inward position for engagement with the film roll convolutions on the core, said first mentioned mechanism being also connected to the roll size measuring member.

18. A self-threading motion picture machine, comprising in combination with a spindle for a film supply spool, a film gate, and a friction drive spindle for receiving a film take-up spool having a core with a slot, a film loop former provided with a movable member located between the film gate and the drive spindle, a film guide located between said film loop former and the drive spindle and movable between retracted and extended positions, said film guide being provided with a blade end for intercepting the movement of the take-up spool and entering the slot in the spool core when the film guide is moved to its extended position, means for moving the film guide to its extended position, and means for returning the film guide to its retracted position including a part of the movable member of said loop former operated by a back pressure of the film after it has entered the spool core.

19. The combination of claim 18, in which independent manual means are additionally provided for returning the film guide to its retracted position.

20. The combination of claim 1, in which independent manual means are additionally provided for releasing said latching means to return the film guide to its retracted position.

References Cited by the Examiner
UNITED STATES PATENTS

| | | | |
|---|---|---|---|
| 1,090,128 | 3/14 | Avers | 33—172 |
| 1,225,184 | 5/17 | Segel | 242—55.11 |
| 2,203,655 | 6/40 | Lechleitner et al. | 352—158 |
| 2,420,587 | 5/47 | Dietrich | 352—158 |
| 3,079,055 | 2/63 | Chevallaz | 242—74 |

NORTON ANSHER, *Primary Examiner.*

WILLIAM MISIEK, *Examiner.*